US012645410B2

(12) United States Patent
Chen et al.

(10) Patent No.: US 12,645,410 B2
(45) Date of Patent: Jun. 2, 2026

(54) PRINT CONTROL DEVICE AND SIGNAL TRANSMISSION METHOD THEREOF

(71) Applicant: AVISION INC., Hsinchu (TW)

(72) Inventors: Yen-Cheng Chen, Hsinchu (TW); Jui-Chang Liu, Hsinchu (TW)

(73) Assignee: AVISION INC., Hsinchu (TW)

( * ) Notice: Subject to any disclaimer, the term of this patent is extended or adjusted under 35 U.S.C. 154(b) by 358 days.

(21) Appl. No.: 18/527,424

(22) Filed: Dec. 4, 2023

(65) Prior Publication Data

US 2024/0184492 A1 Jun. 6, 2024

(30) Foreign Application Priority Data

Dec. 5, 2022 (TW) .................................. 111146616

(51) Int. Cl.
G06F 3/12 (2006.01)

(52) U.S. Cl.
CPC ............ G06F 3/121 (2013.01); G06F 3/1208 (2013.01); G06F 3/1234 (2013.01)

(58) Field of Classification Search
CPC ...... G06F 3/121; G06F 3/0659; G06F 3/1294; G06F 3/1234; G06F 11/002
USPC ............................................... 358/1.15, 1.14
See application file for complete search history.

(56) References Cited

U.S. PATENT DOCUMENTS

| | | | |
|---|---|---|---|
| 2009/0034021 A1 | 2/2009 | Taki et al. | |
| 2020/0108602 A1 | 4/2020 | Lee et al. | |
| 2024/0103560 A1* | 3/2024 | Tsukahara | ........... G06F 11/0733 |

FOREIGN PATENT DOCUMENTS

| | | | |
|---|---|---|---|
| JP | 2014138344 A * | 7/2014 | |
| KR | 20040069884 A * | 8/2004 | |

* cited by examiner

*Primary Examiner* — Jamares Q Washington

(57) ABSTRACT

Disclosed are a document processing device and a signal transmission method thereof. The document processing device includes a processor and a printing engine. The processor is connected to the printing engine. The processor receives a document output command to generate a first differential signal. Then, the printing engine receives the first differential signal and converts the first differential signal into a first interference-free information packet. When the printing engine has already obtained the first interference-free information packet, the printing engine sends a buffer status checking signal to the processor. The document processing device uses the transmission of the first differential signal to reduce printing information errors caused by static interference, so as to achieve the purpose of improving the accuracy of printing information.

7 Claims, 6 Drawing Sheets

<u>10</u>

10

10

10

PRINT CONTROL DEVICE AND SIGNAL TRANSMISSION METHOD THEREOF

CROSS REFERENCE TO RELATED PRESENT DISCLOSURE

This application claims the priority benefit of Taiwan Patent Application Serial Number 111146616, filed on Dec. 5, 2022, the full disclosure of which is incorporated herein by reference.

BACKGROUND

Technical Field

The present disclosure relates to a signal transmission device and a method thereof, in particular to a document processing device and a signal transmission method thereof.

Related Art

The existing document processing devices, such as multifunction printers and printers, are mainly composed of an input device, a processing device and an output device. The input device is used to hold paper. When the processing device receives a document output command, it instructs the input device to input the paper. Then, the processor controls the output device to perform exposure processing on the paper according to the document output command, so as to output the printing information corresponding to the document output command onto the paper to output a document.

However, in the process from receiving the document output command to outputting the document by the document processing device in the prior art, the paper is attached to the input device during the paper feeding process, causing static electricity on the paper. Then, the static electricity on the paper interferes with the document output command and cause errors in the document output command. As a result, the printing information corresponding to the document output command is printed incorrectly on the paper, resulting in errors in the output document.

Therefore, the existing technology really needs to be further improved to provide better solutions.

SUMMARY

In view of the above-mentioned deficiencies in the prior art, the main purpose of the present disclosure is to provide a document processing device and a signal transmission method thereof, which reduce printing information errors caused by static interference through differential transmission to achieve the purpose of improving the accuracy of printing information.

To achieve the above purpose, the present disclosure discloses a document processing device, which includes a processor configured to receive a document output command to generate a first differential signal; and a printing engine connected to the processor and configured to receive the first differential signal and convert the first differential signal into a first interference-free information packet. When the printing engine has already obtained the first interference-free information packet, the printing engine sends a buffer status checking signal to the processor.

With the above structure, by converting the document output command into the first differential signal for transmission, and by confirming whether the first interference-free information packet has been already obtained, the printing information errors caused by static interference during transmission of the document output command are reduced, to achieve the purpose of improving the accuracy of printing information.

To achieve the above purpose, the present disclosure further discloses a signal transmission method of a document processing device, which is executed by the document processing device and includes the following steps: obtaining a document output command; generating a first differential signal according to the document output command; converting the first differential signal to generate a first interference-free information packet; and sending a buffer status checking signal if the first interference-free information packet is already available.

Through the above method, by converting the document output command into the first differential signal for transmission, and by confirming whether the first interference-free information packet has been already obtained, the printing information errors caused by static interference during transmission of the document output command are reduced, to achieve the purpose of improving the accuracy of printing information.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as "directly connected" or "directly coupled" to another element, there is no intervening element therebetween.

Figure 1:
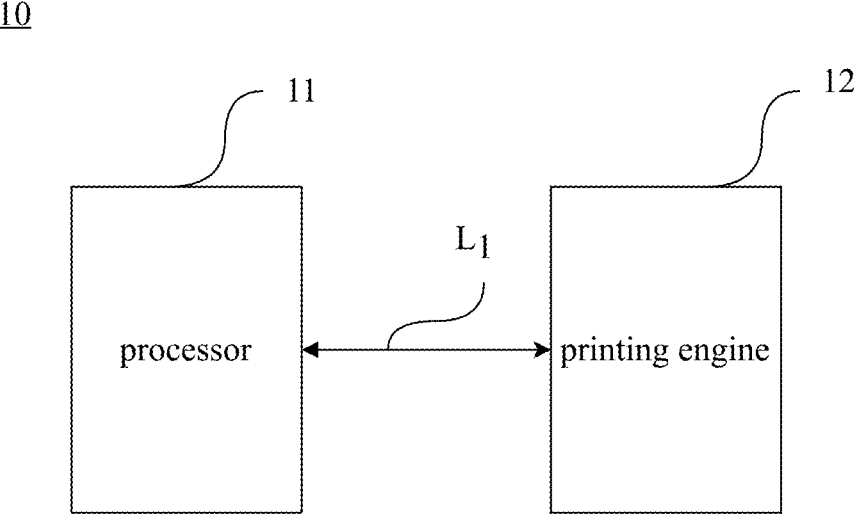
FIG. 1 is a block diagram of an embodiment of a document processing device according to the present disclosure.

Regarding the embodiment of the present disclosure, as shown in FIG. 1, the present disclosure provides a document processing device 10, which comprises a processor 11 and a printing engine 12. The processor 11 is connected to the printing engine 12 through a signal line L1, so that the printing engine 12 can receive printing information from the processor 11 through the signal line L1. In this embodiment, the processor 11 can be an Application Specific Integrated Circuit (ASIC), and the document processing device 10 can be a multifunction machine, a printer with a scanning function, or a printer.

Specifically, when the user wants to use the document processing device 10 to output the print information, the processor 11 generates a document output command according to the print information. Then, the processor 11 generates a first differential signal according to the document output command. After receiving the first differential signal from the processor 11, the printing engine 12 converts and encodes the first differential signal into a first interference-free information packet, and determines whether the first interference-free information packet has been already obtained. When the printing engine 12 has already obtained the first interference-free information packet, the printing engine 12 transmits a buffer status checking signal (i.e., BUFFER_FULL/ERROR, BF_ERR) to the processor 11, so that the processor 11 determines whether to send the next differential signal to the printing engine 12. In this embodiment, the signal line L1 can be more than two unidirectional transmission signal lines or a bidirectional transmission signal line, and the first differential signal can be a low-voltage differential signal (LVDS). Through the transmission of the first differential signal, interference noise generated by the static electricity is eliminated.

Figure 2:
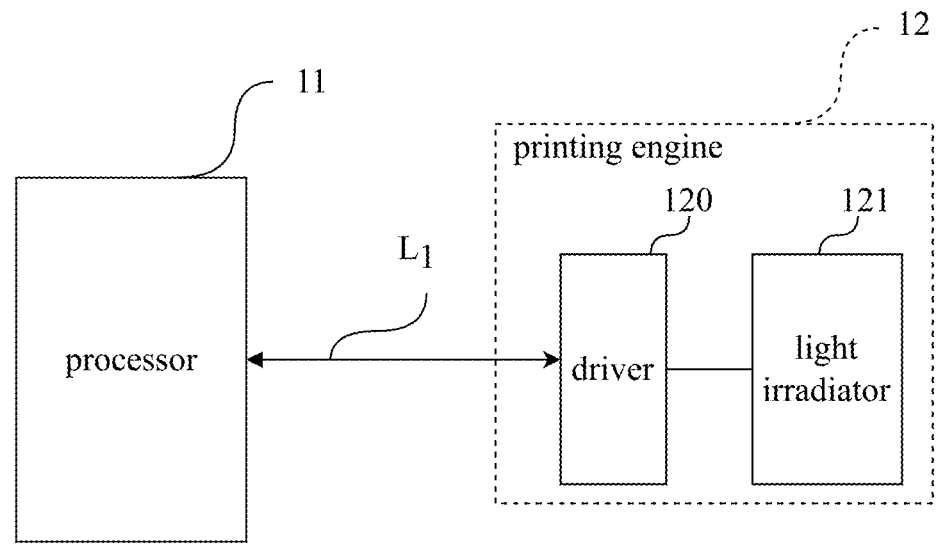
FIG. 2 is another block diagram of an embodiment of a document processing device according to the present disclosure.

In this embodiment, as shown in FIG. 2, the printing engine 12 further comprises a driver 120 and a light irradiator 121. The driver 120 is connected to the processor 11 and the light irradiator 121. The driver 120 receives the first differential signal from the processor 11 and converts the first differential signal into the first interference-free information packet. Then, the light irradiator 121 generates an optical signal according to the first interference-free information packet, and then outputs the printing information on the paper by controlling the optical signal.

Figure 3A:
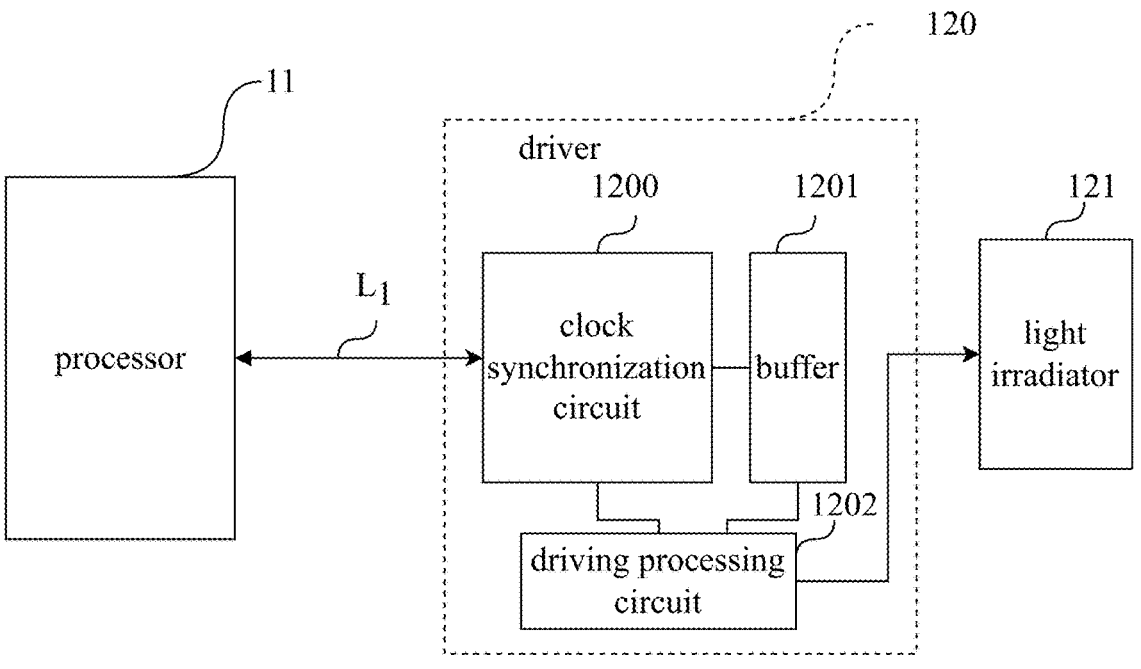
FIG. 3A is still another block diagram of an embodiment of a document processing device according to the present disclosure.
Figure 3B:
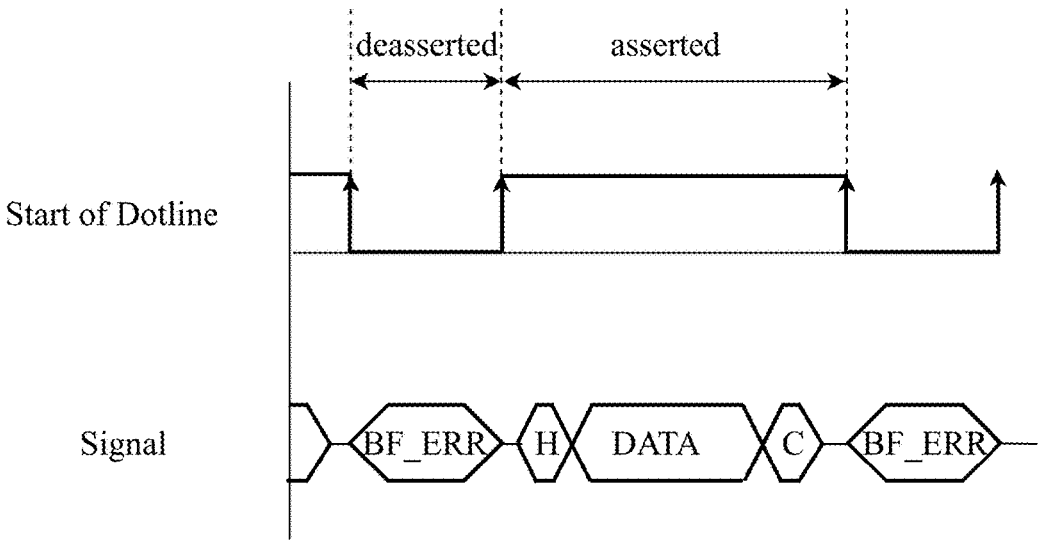
FIG. 3B is a signal waveform diagram of an embodiment of a document processing device according to the present disclosure.

In this embodiment, please refer to FIG. 3A and FIG. 3B. The driver 120 further comprises a clock synchronization circuit 1200, a buffer 1201 and a driving processing circuit 1202. The clock synchronization circuit 1200 is connected to the processor 11 and the buffer 1201, and the driving processing circuit 1202 is connected to the clock synchronization circuit 1200 and the buffer 1201. The clock synchronization circuit 1200 obtains a first clock signal (i.e., Start of Dotline, SOD) from the processor 11 and generates a synchronization clock signal according to the first clock signal and a feedback signal corresponding to the first clock signal. Then, when the driving processing circuit 1202 receives the first differential signal and converts the first differential signal into the first interference-free information packet, and receives the synchronization clock signal, the driving processing circuit 1202 stores the first interference-free information packet into the buffer 1201 according to the synchronization clock signal. In this embodiment, the clock synchronization circuit 1200 may be a phase-locked loop (PLL) circuit.

In the above embodiment, the first interference-free information packet has synchronization information H, transmission data DATA and verification information C.

In this embodiment, when the synchronization clock signal is asserted, the driving processing circuit 1202 determines whether the buffer 1201 has stored the first interference-free information packet according to a trigger signal of the synchronization clock signal or determines whether the clock synchronization circuit 1200 has lost lock. When the driving processing circuit 1202 determines that the buffer 1201 has stored the first interference-free information packet, the buffer status checking signal is set to a first potential signal. When the clock synchronization circuit 1200 has lost lock, the buffer status checking signal is set to the first potential signal. The buffer status checking signal set to the first potential signal is sent to the processor 11. Then, the processor 11 waits until the buffer status checking signal, which is the inverted signal of the first potential signal, is received (that is, there is no data stored in the buffer 1201 or the clock synchronization circuit 1200 has been locked) before sending the next clock. In this embodiment, the first potential signal is a low potential signal.

In this embodiment, when the synchronization clock signal is deasserted, the driving processing circuit 1202 further determines whether the verification information C of the first interference-free information packet is correct according to the trigger signal of the synchronization clock signal. When the first interference-free information packet is incorrect, the driving processing circuit 1202 sends an error checking signal of the buffer status checking signal; at this time, the error checking signal is a second potential signal; then, the driving processing circuit 1202 deletes the first interference-free information packet in the buffer 1201 according to the error checking signal being the second potential signal. When the driving processing circuit 1202 receives an inverted signal of the second potential signal, the first interference-free information packet is stored. In this embodiment, a cyclic redundancy check (CRC) mechanism can be used to determine whether the verification information C is correct. In this embodiment, the second potential signal is a low potential signal.

Figure 4:
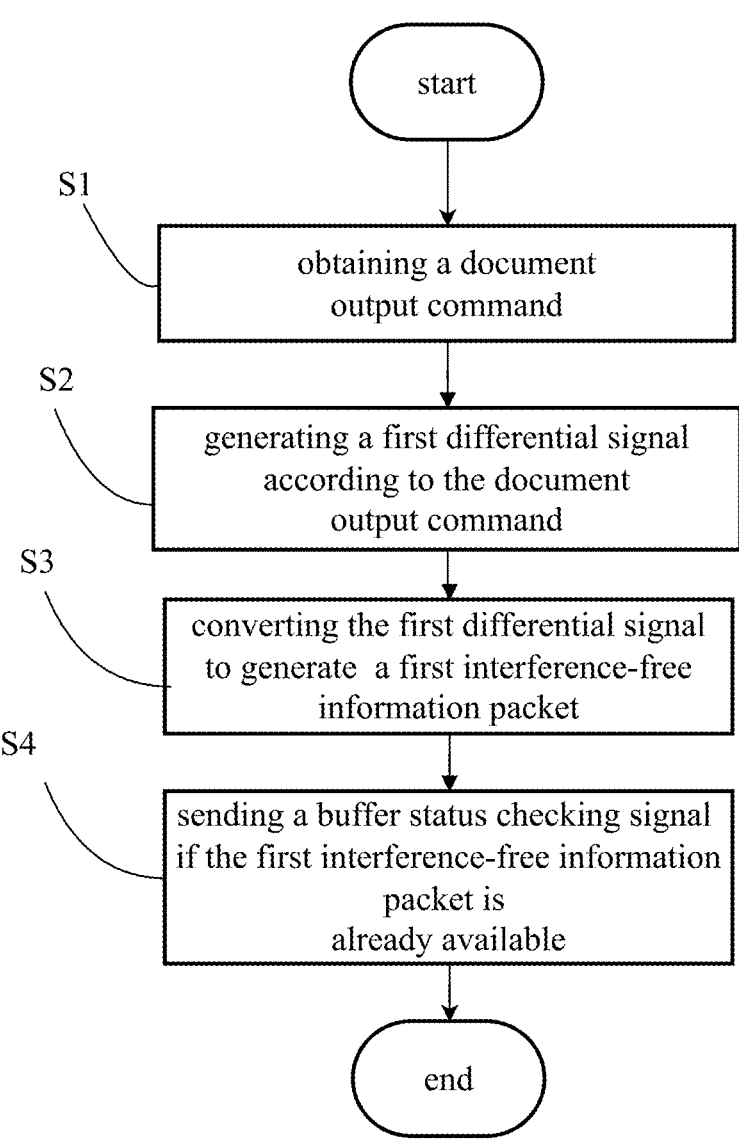
FIG. 4 is a flow chart of an embodiment of a signal transmission method of a document processing device according to the present disclosure.

In addition, the present disclosure further provides a signal transmission method of the document processing device 10. As shown in FIG. 4, in this embodiment, the signal transmission method of the document processing device is executed by the document processing device 10 and comprises the following steps: obtaining a document output command (S1); generating a first differential signal according to the document output command (S2); converting the first differential signal to generate a first interference-free information packet (S3); and sending a buffer status checking signal if the first interference-free information packet is already available (S4).

Figure 5:
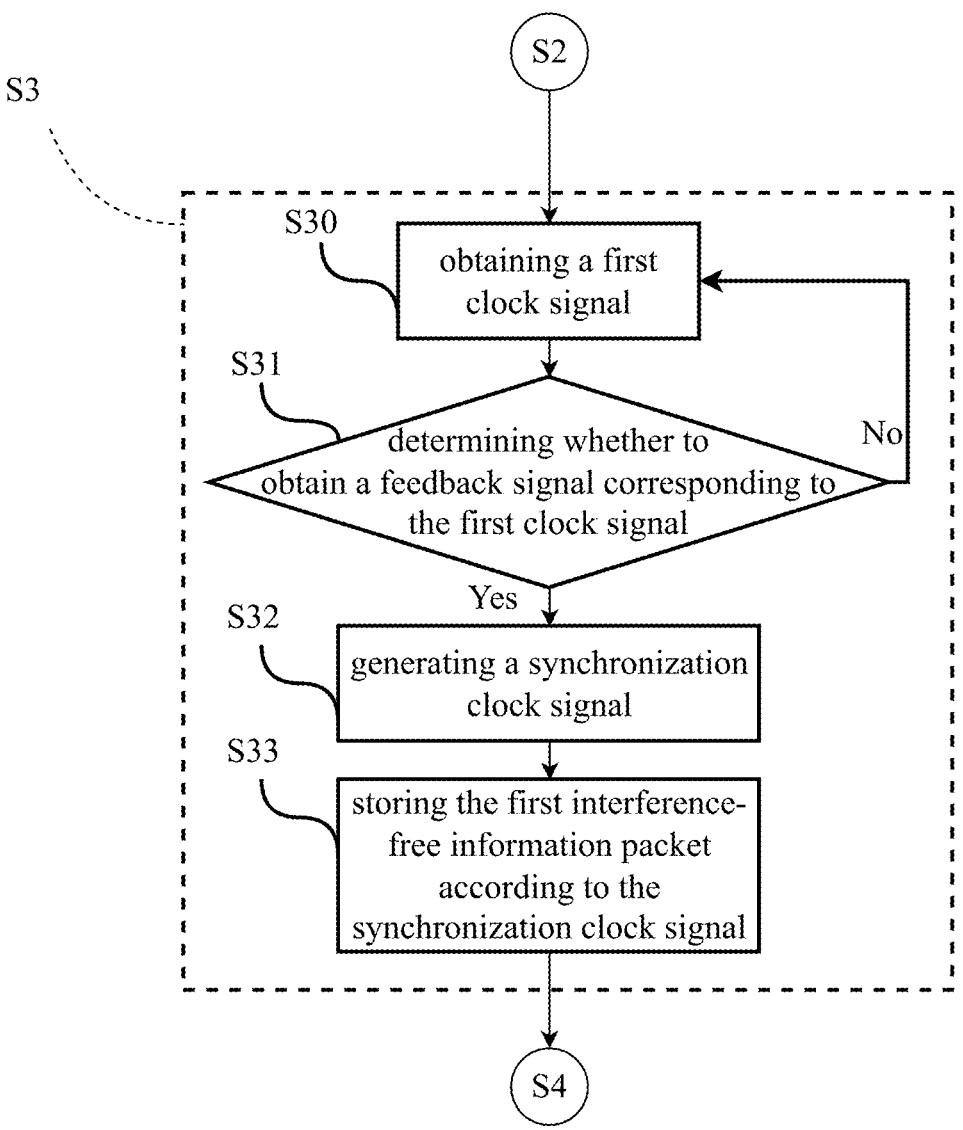
FIG. 5 is another flow chart of an embodiment of a signal transmission method of a document processing device according to the present disclosure.

In this embodiment, as shown in FIG. 5, the step (S3) of converting the first differential signal to generate the first interference-free information packet comprises the following sub-steps: obtaining a first clock signal (S30); determining whether to obtain a feedback signal corresponding to the first clock signal (S31); if so, generating a synchronization clock signal (S32); storing the first interference-free information packet according to the synchronization clock signal (S33).

5

6

Figure 6:
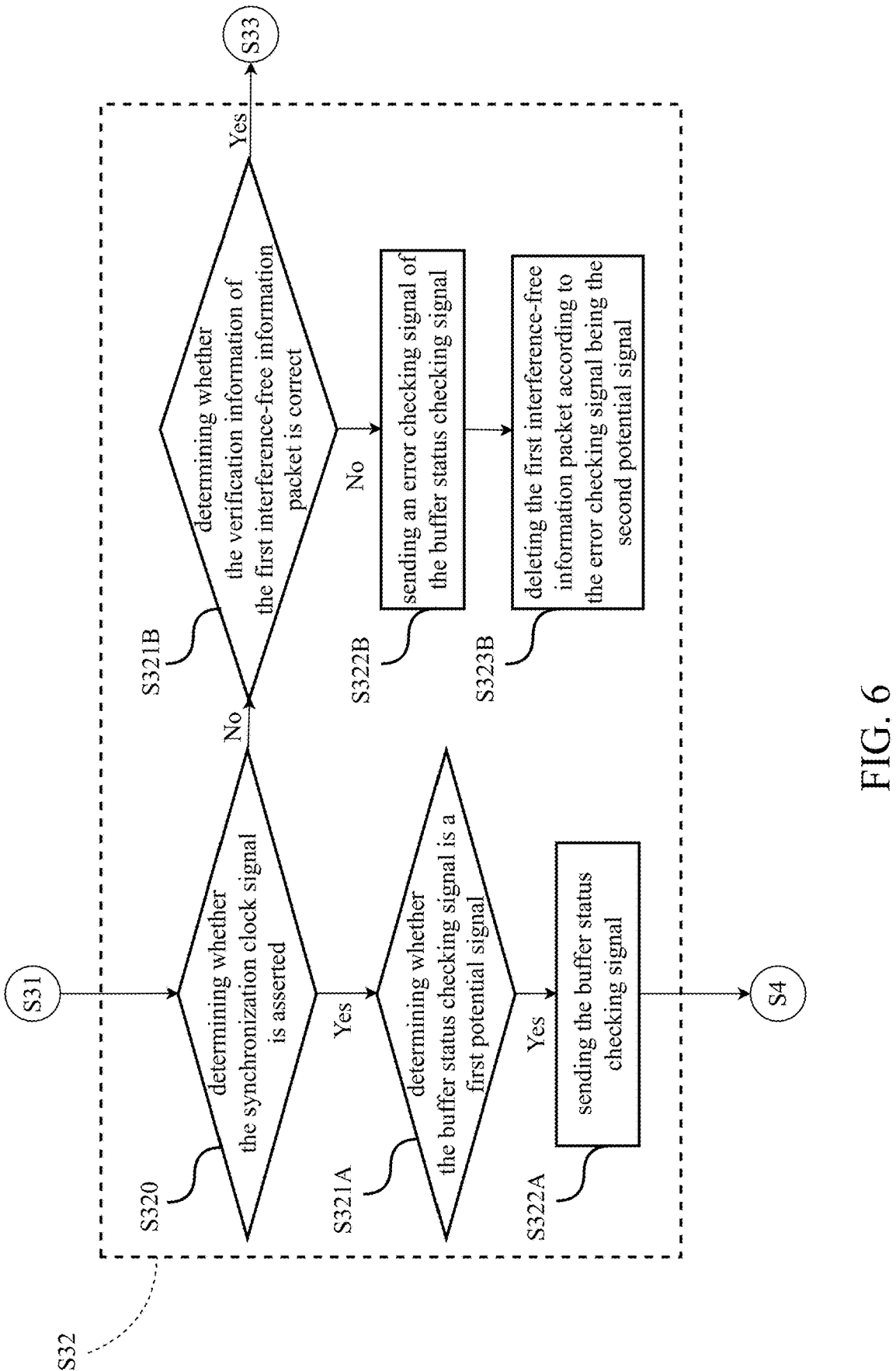
FIG. 6 is still another flow chart of an embodiment of a signal transmission method of a document processing device according to the present disclosure.

In this embodiment, as shown in FIG. 6, the sub-step (S32) of if so, generating the synchronization clock signal comprises the following sub-steps: determining whether the synchronization clock signal is asserted (S320); determining whether the buffer status checking signal is a first potential signal if the synchronization clock signal is asserted (S321A); sending the buffer status checking signal if the buffer status check signal is the first potential signal (S322A). If the buffer status checking signal is not the first potential signal, the aforementioned sub-step (S320) of determining whether the synchronization clock signal is asserted is executed.

In this embodiment, as still shown in FIG. 6, after the step (S320) of determining whether the synchronization clock signal is asserted, the sub-step (S32) of if so, generating the synchronization clock signal further comprises the following sub-steps: determining whether the verification information of the first interference-free information packet is correct if the synchronization clock signal is deasserted (S321B); executing the aforementioned step (S33) of storing the first interference-free information packet according to the synchronization clock signal if the verification information of the first interference-free information packet is correct; sending an error checking signal of the buffer status checking signal if the verification information of the first interference-free information packet is incorrect, wherein the error checking signal is a second potential signal (S322B); and deleting the first interference-free information packet according to the error checking signal being the second potential signal (S323B).

To sum up, when the document processing device 10 of the present disclosure receives the document output command generated by the printing information, it converts the document output command into the first differential signal. The document processing device uses the transmission of the first differential signal to reduce printing information errors caused by static interference during transmission of the document output command, to achieve the purpose of improving the accuracy of printing information.

While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. A document processing device, comprising:
   a processor configured to receive a document output command to generate a first differential signal;
   a printing engine connected to the processor and configured to receive the first differential signal and convert the first differential signal into a first interference-free information packet; and
   a driver connected to the processor to receive the first differential signal and convert the first differential signal into the first interference-free information packet;
   wherein when the printing engine has already obtained the first interference-free information packet, the printing engine sends a buffer status checking signal to the processor;
   wherein the driver comprises:
   a clock synchronization circuit connected to the processor and configured to obtain a first clock signal from the processor, and generate a synchronization clock signal according to the first clock signal and a feedback signal corresponding to the first clock signal;
   a buffer connected to the clock synchronization circuit; and
   a driving processing circuit connected to the clock synchronization circuit and the buffer, and configured to receive the synchronization clock signal and the first interference-free information packet;
   wherein when the synchronization clock signal is deasserted, the driving processing circuit determines whether verification information of the first interference-free information packet is correct according to a trigger signal of the synchronization clock signal; when the verification information is incorrect, the driving processing circuit sends an error checking signal of the buffer status checking signal to the processor, and the processor deletes the first interference-free information packet in the buffer according to the error checking signal.

2. The document processing device according to claim 1, wherein the printing engine comprises:
   a light irradiator connected to the driver and configured to generate an optical signal according to the first interference-free information packet.

3. The document processing device according to claim 2, wherein when the driving processing circuit receives the first interference-free information packet and the synchronization clock signal, it stores the first interference-free information packet into the buffer according to the synchronization clock signal.

4. The document processing device according to claim 3, wherein when the synchronization clock signal is asserted, the driving processing circuit determines whether the buffer has stored the first interference-free information packet or determines whether the clock synchronization circuit has lost lock according to the trigger signal of the synchronization clock signal; if so, the driving processing circuit sets the buffer status checking signal to a first potential signal.

5. A signal transmission method of a document processing device, which is executed by the document processing device and comprises the following steps:
   obtaining a document output command;
   generating a first differential signal according to the document output command;
   converting the first differential signal to generate a first interference-free information packet, which comprises:
   obtaining a first clock signal;
   determining whether to obtain a feedback signal corresponding to the first clock signal;
   if so, generating a synchronization clock signal, which comprises:
   determining whether the synchronization clock signal is asserted;
   determining whether the buffer status checking signal is a first potential signal if the synchronization clock signal is asserted; and
   sending the buffer status checking signal if the buffer status check signal is the first potential signal; and
   storing the first interference-free information packet according to the synchronization clock signal; and
   sending a buffer status checking signal if the first interference-free information packet is already available.

6. The signal transmission method according to claim 5, wherein the first interference-free information packet has synchronization information, transmission data and verification information.

7. The signal transmission method according to claim 6, wherein after the sub-step of determining whether the synchronization clock signal is asserted, the sub-step of if so, generating the synchronization clock signal further comprises the following sub-steps:

determining whether the verification information of the first interference-free information packet is correct if the synchronization clock signal is deasserted;

executing the step of storing the first interference-free information packet according to the synchronization clock signal if the verification information of the first interference-free information packet is correct;

sending an error checking signal of the buffer status checking signal if the verification information of the first interference-free information packet is incorrect, wherein the error checking signal is a second potential signal; and deleting the first interference-free information packet according to the error checking signal being the second potential signal.

* * * * *